Figure 1:
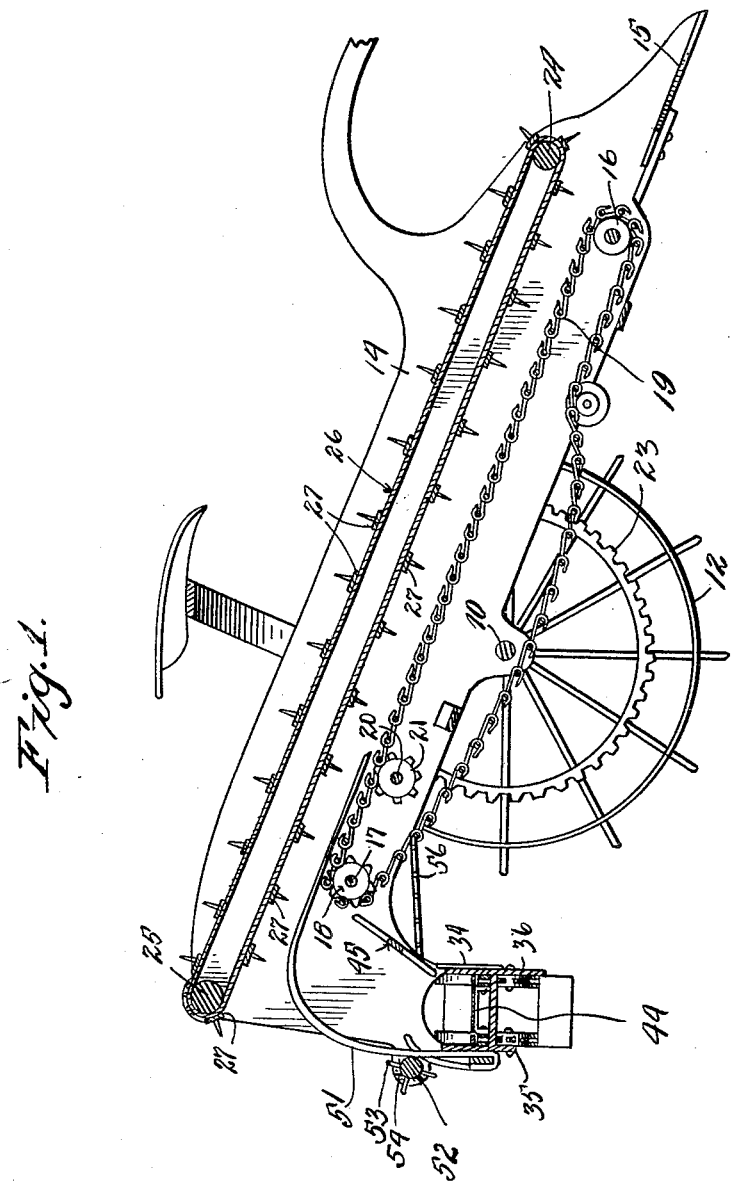

L. BRANDT.
POTATO GATHERER.
APPLICATION FILED AUG. 5, 1914.

1,131,465.

Patented Mar. 9, 1915.
4 SHEETS—SHEET 1.

Witnesses

Inventor
L. Brandt.

By
Attorney

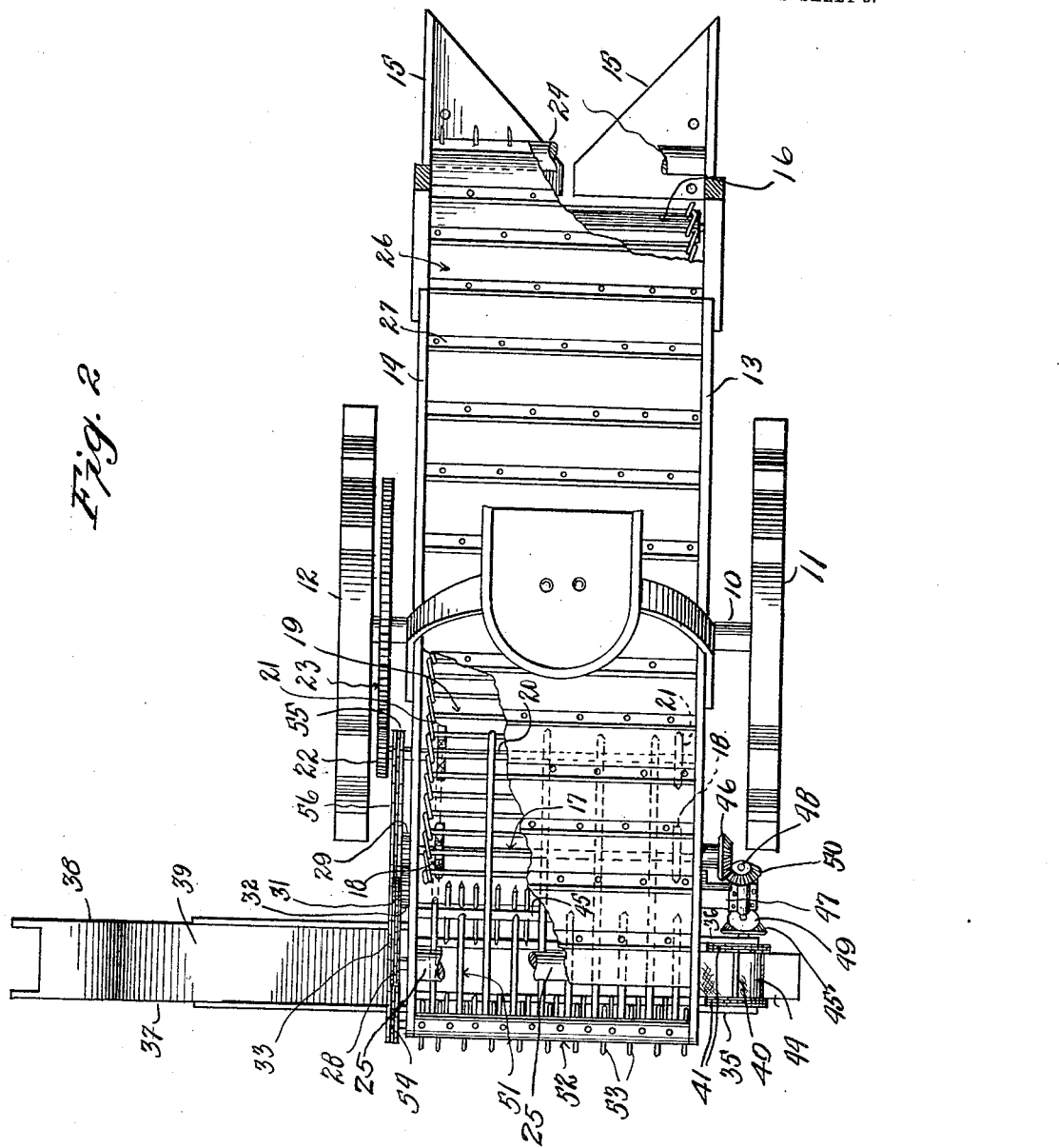

L. BRANDT.
POTATO GATHERER.
APPLICATION FILED AUG. 5, 1914.
1,131,465.
Patented Mar. 9, 1915.
4 SHEETS—SHEET 3.
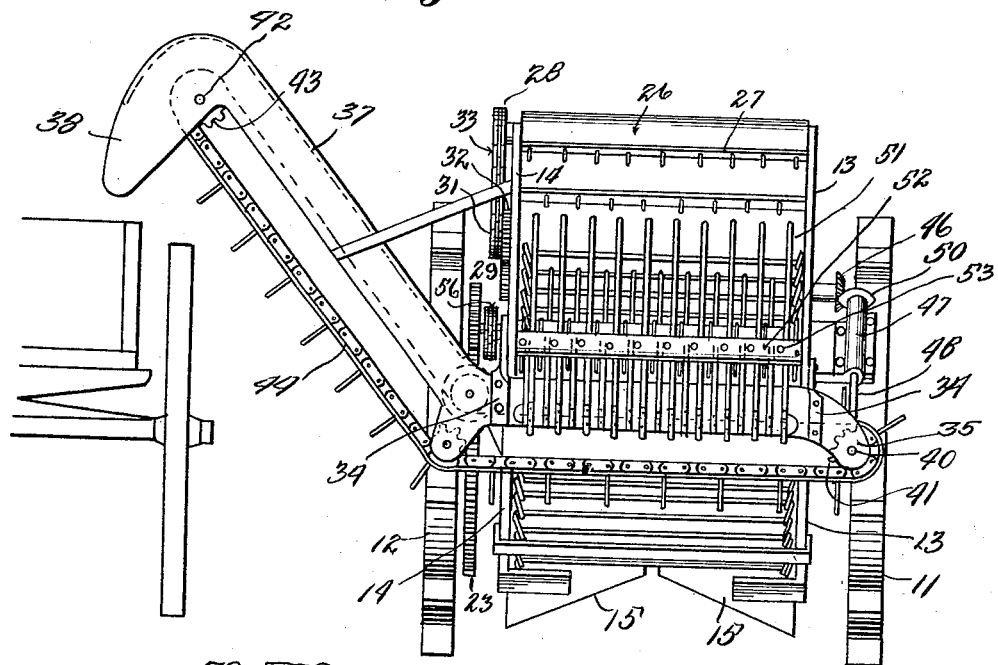
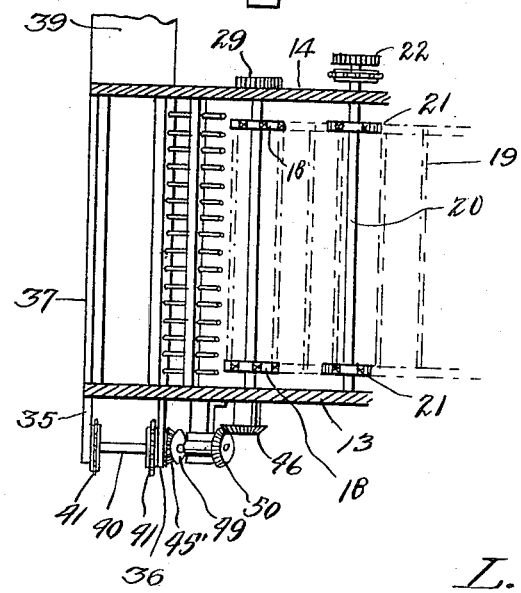
Witnesses
Inventor
L. Brandt
By
Attorney L. BRANDT.
POTATO GATHERER.
APPLICATION FILED AUG. 5, 1914.
1,131,465.
Patented Mar. 9, 1915.
4 SHEETS—SHEET 4.
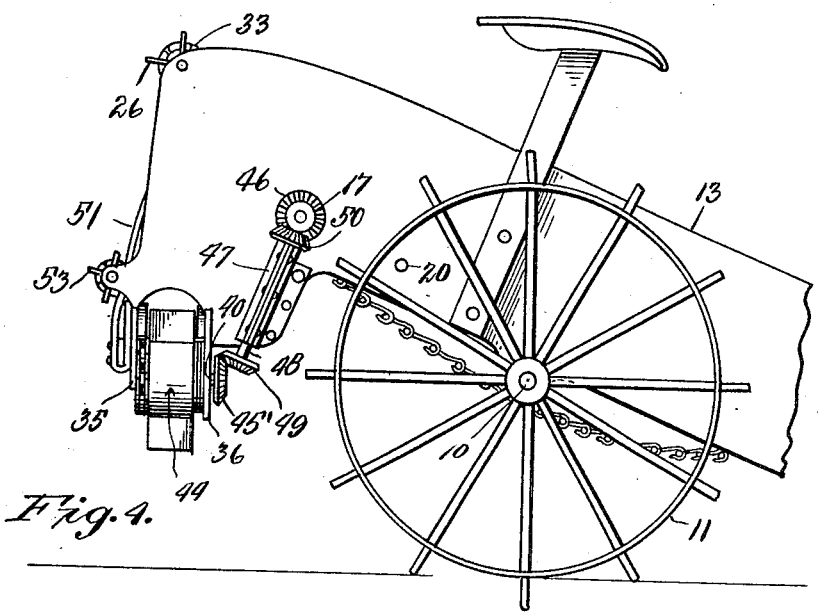
Fig. 4.
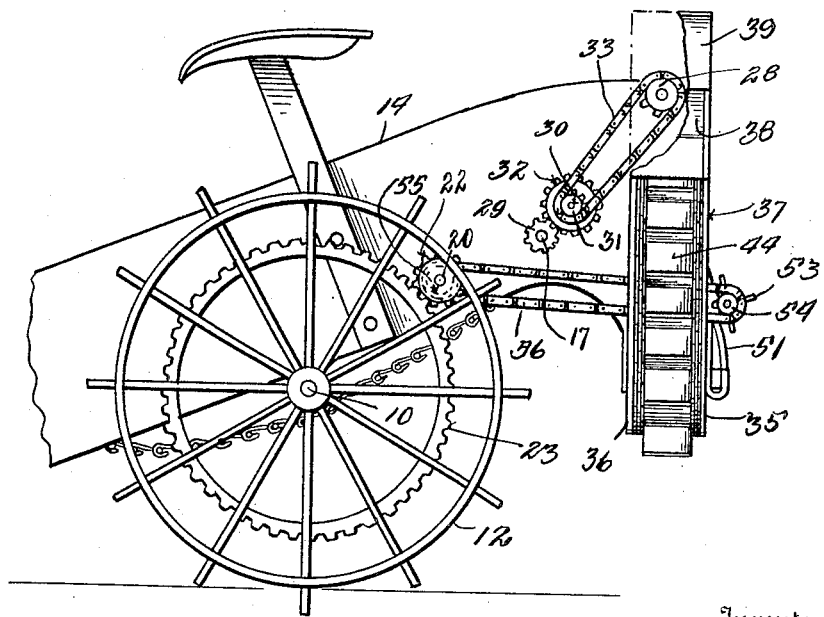
Fig. 5.
Witnesses
Inventor
L. Brandt.
By 
Attorneys

UNITED STATES PATENT OFFICE.

LOUIS BRANDT, OF LOUISBURG, WISCONSIN.

POTATO-GATHERER.

1,131,465. Specification of Letters Patent. Patented Mar. 9, 1915.

Application filed August 5, 1914. Serial No. 855,195.

*To all whom it may concern:*

Be it known that I, LOUIS BRANDT, a citizen of the United States, residing at Louisburg, in the county of Grant, State of Wisconsin, have invented certain new and useful Improvements in Potato-Gatherers; and I do hereby declare the following to be a full, clear, and exact description of the invention, such as will enable others skilled in the art to which it appertains to make and use the same.

This invention relates to potato gatherers.

The object of the invention resides in the provision of a potato gatherer embodying an improved construction for effectively separating the potatoes from the vines and then loading the separated potatoes into a wagon along side of the machine.

A further object of the invention resides in the provision of a potato gatherer which will be simple in construction, efficient in use and embodying comparatively few parts.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a longitudinal section of a potato gatherer constructed in accordance with the invention; Fig. 2, a plan view partly broken away; Fig. 3, a rear view of the potato gatherer; Fig. 4, a partial side view of the gatherer; Fig. 5, a view similar to Fig. 4 looking at the opposite side, and Fig. 6, a partial horizontal section through the rear of the machine.

Referring to the drawings the improved potato gatherer is shown as comprising an axle 10 upon which are mounted traction wheels 11 and 12. Pivotally mounted upon this axle 10 are side members 13 and 14 between the forward ends of which are mounted gathering blades or scoops 15. Rotatably mounted between the members 13 and 14 just at the rear of the blades 15 is a roller 16. Rotatably mounted between the members 13 and 14 at the rear of the axle 10 is a shaft 17 upon which are fixed sprocket wheels 18 and traveling on the roller 16 and sprocket wheel 18 is a conveyer 19. Rotatably mounted in the members 13 and 14 forward of the shaft 17 is a shaft 20 upon which are fixed sprocket wheels 21 which engage the conveyer 19. One end of the shaft 20 is disposed exteriorly of the member 14 and has fixed thereon a gear 22 which meshes with a gear 23 fixed on the axle 10. By this construction it will be obvious that as the axle 10 rotates the shaft 20 will be rotated and this rotation of the shaft 20 through the medium of the sprocket wheel 21 will effect the necessary movement of the conveyer 19. Rotatably mounted between the members 13 and 14 at the forward end thereof and above the rollers 16 is a roller 24, while another roller 25 is rotatably mounted between said members at the rear end of the latter and traveling on the rollers 24 and 25 is a raker conveyer 26 carrying the usual rake bars 27. One of the trunnions of the roller 25 is extended through the member 14 and has fixed thereon a sprocket wheel 28. Likewise the shaft 17 is extended through the member 14 and has fixed thereon a gear 29. Rotatably mounted on the member 14 between the shaft 17 and the wheel 28 is a stub shaft 30 which has fixed thereon a sprocket wheel 31 and a gear 32, the latter meshing with the gear 29 while a sprocket chain 33 travels on the sprocket wheels 28 and 31 for the purpose of imparting the necessary movement to the conveyer 26 as will be obvious.

Depending from the rear of the members 13 and 14 are brackets 34 which support spaced cross plates 35 and 36. These cross plates extend upwardly adjacent the member 14 as at 37 and terminate in a discharge spout 38, said plates being connected outwardly of the member 14 by a plate 39. Rotatably mounted between the plates 35 and 36 at the end thereof adjacent the member 13 is a shaft 40 upon which are fixed sprocket wheels 41. Rotatably mounted between the plates 35 and 36 at the inner end of the spout 38 is a shaft 42 upon which are fixed sprocket wheels 43 and traveling on the sprocket wheels 41 and 43 is a conveyer 44 which is adapted to receive potatoes from the conveyer 19, a screen 45 being mounted between the members 13 and 14 for the purpose of directing the potatoes from the conveyer 19 to the conveyer 44. The shaft 40 is extended through the plate 36 and has fixed on the inner end thereof a beveled gear 45'. The shaft 17 is extended through the member 13 and has fixed on this extended end a beveled gear 46. Carried by the member 13 is a bracket 47 in which is rotatably mounted a shaft 48 having fixed thereon gears 49 and 50 meshing respectively with the gears 45 and 46. By this construction suitable provision is made for the operation of the conveyer 44. Secured to the plate 35 between the members 13 and 14 is a plurality of fingers 51, said fingers being of different lengths with the free ends of the longest fingers directed forwardly and disposed over the conveyer 19 relatively near the latter, while the free ends of the shortest fingers are spaced from the rear end of the conveyer 19. The fingers 51 are alternately long and short so that the vines on the conveyer 19 will ride over the upper side of the long fingers and be discharged at the rear of the machine, while the potatoes will pass between the long fingers and discharge into the conveyer 44.

Rotatably mounted between the members 13 and 14 at the rear of the fingers 51 is a roller 52 provided with radial arms 53 adapted to pass between adjacent fingers 51 during the rotation of said roller. The trunnion of the roller 52 adjacent the member 14 is extended and has fixed thereon a sprocket wheel 54 which alines with a sprocket wheel 55 fixed on the shaft 20 and traveling on the sprocket wheels 54 and 55 is a sprocket chain 56 whereby the rotation of the shaft 20 will effect rotation of the roller 52.

In the operation of the machine it will be obvious that as the potatoes are gathered from the ground by the blades 15 they will be delivered to the conveyer 19 and carried to the rear by the latter. During this operation the conveyer 26 will assist the movement of the potato vines to the rear as will be obvious. As the potatoes reach the rear of the conveyer 19 the vines will pass over the long fingers 51 and the potatoes between same, the vines being separated from the potatoes by the pull exerted thereon by the conveyer 26 and discharged from the rear of the machine. The separated potatoes will then pass over the screen 45 to the conveyer 44 by which latter they will be conveyed to a wagon stationed beside the machine. Should any vines clog between the fingers 51 they will be removed and thrown to the rear by the fingers 53 on the roller 52.

What is claimed is:—

1. In a potato gatherer, the combination of a wheeled axle, a frame pivoted on said axle, gathering mechanism carried at the forward end of said frame, a conveyer mounted on the frame for receiving material from the gathering mechanism, a plurality of fingers carried by the frame, said fingers being of unequal length and successively long and short, the free ends of the long fingers being directed forward over the conveyer and relatively close thereto and the free ends of the short fingers being disposed in spaced relation to the rear of said conveyer, and a second conveyer mounted on the frame above the first named conveyer, said second conveyer carrying a plurality of transverse rake bars.

2. In a potato gatherer, the combination of a wheeled axle, a frame pivoted on said axle, gathering mechanism carried at the forward end of said frame, a conveyer mounted on the frame for receiving material from the gathering mechanism, a plurality of fingers carried by the frame, said fingers being of unequal length and successively long and short, the free ends of the long fingers being directed forward over the conveyer and relatively close thereto and the free ends of the short fingers being disposed in spaced relation to the rear of said conveyer, a second conveyer mounted on the frame above the first named conveyer, said second conveyer carrying a plurality of transverse rake bars, a roller rotatably mounted transversely of the frame at the rear of said fingers, and a plurality of radial arms on said roller movable between the fingers during rotation of the roller.

In testimony whereof I affix my signature, in the presence of two witnesses.

LOUIS BRANDT.

Witnesses:
LAMBERT LUTTERS,
EDW. APFELD.

Copies of this patent may be obtained for five cents each, by addressing the "Commissioner of Patents, Washington, D. C."